United States Patent [19]

Rechter

[11] 4,066,467
[45] Jan. 3, 1978

[54] ALUMINOUS REFRACTORY COMPOSITION CONTAINING CARBON

[75] Inventor: Harold L. Rechter, Chicago, Ill.

[73] Assignee: Chicago Fire Brick Company, Chicago, Ill.

[21] Appl. No.: 770,116

[22] Filed: Feb. 18, 1977

[51] Int. Cl.² .............................................. C04B 35/52
[52] U.S. Cl. ......................................... 106/56; 106/85
[58] Field of Search ...................................... 106/56, 85

[56] References Cited

U.S. PATENT DOCUMENTS

| 3,810,768 | 5/1974 | Parsons et al. | 106/56 |
| 3,842,760 | 10/1974 | Parsons et al. | 106/56 |

Primary Examiner—J. Poer
Attorney, Agent, or Firm—Foster York

[57] ABSTRACT

A plastic refractory lining composition which can be applied by hand or trowel to refractory or bare metal surfaces and is particularly resistant to slag and hot metal erosion and to metal skulling is comprised of a blend of high alumina or aluminum silicate coarse aggregates with a fine matrix of calcined alumina, carbon, and bentonite employing a phosphate binder and tetrasodium pyrophosphate for modification and stabilization of plasticity characteristics. Finely divided silicon metal can be included to impart oxidation resistance to the carbon. This refractory is sufficiently "sticky" for ease of building a lining.

6 Claims, No Drawings

ALUMINOUS REFRACTORY COMPOSITION CONTAINING CARBON

This invention relates to refractory composition suitable for applying to metal or refractory surfaces, such as of interior portions of metal melting furnaces, ladles, tap holes, spouts, tuyeres, etc., especially aqueous compositions having a sufficiently soft consistency for application by hand or by trowel without tendency to flow or slump. The formulations, with phosphate bonding and containing carbon particles, such as, for example, graphite, develop high strength and impart exceptional resistance to slag and metal erosion but are not strongly adhered to metal skulls, and are so constituted to minimize drying shrinkage despite the soft consistency.

The refractory composition is comprised in large part (35–60 percent) of a coarse aggregate of alumina or aluminum silicate, and particularly of an aggregate which is selected from the group of tabular or fused aluminas, calcined bauxite, or calcined clay, and can include raw or calcined kyanites, quartz, and crushed fire brick as well. High alumina contents, using tabular alumina or calcined bauxite, provide maximum resistance to slag and metal erosion, but lower alumina contents reduce thermal conductivity, which results in a reduced tendency for skulling. The usual temperature limitations of refractory materials are effectively increased by inclusion of graphite, a nonmelting component.

The aggregate grain sizing is suitably limited to a maximum of one-fourth inch down, preferably all grains should pass through a ⅛ inch screen, to yield the desired textural qualities for hand or trowel application. Extensive "grittiness" is difficult to handle in this manner. Therefore, a maximum of ¼ inch sizing is usually required with no more than 5 percent of the material in the range of one-eighth to one-fourth inch. The plus 10 mesh component should preferably total no more than 10 percent. Below this level, aggregate sizing is not important. The relative coarseness of the one-eighth inch by downs aggregate is advisable, however, to maximize resistance to slag and metal erosion as well as to thermal shock, and to minimize the moisture required for the desired consistency.

The composition also contains a fine matrix that consists essentially of a blend of tabular or calcined alumina, graphite, bentonite, and preferably from 1–2 percent of aluminum trihydrate. The tabular or calcined alumina, comprising 20–40 percent of the total, is suitably −60 mesh and preferably −325 mesh. The bentonite is preferably of the Western or Wyoming type, usually in the −200 mesh size, but this sizing is not critical. The graphite can be initially of any variety, flake, amorphous, or synthetic, but advisably should be ground to at least −20 mesh, preferably −30 mesh, and comprises 10–18 percent of this refractory based on graphite material addition irrespective of its actual carbon content. The addition of 5 percent silicon metal powder will inhibit the graphite from oxidizing in air above 2500° F.

The binder used is a phosphate binder; the term "phosphate binder" includes phosphoric acid and salt of phosphoric acid. A suitable binding agent is 75 percent phosphoric acid, however, equivalent $P_2O_5$ content can be obtained by use of other concentrations of phosphoric acid or with water soluble phosphate salts, such as, for example, monoaluminum dihydrogen phosphate of various strengths. The use of ammonium or sodium phosphates can also be used, but the former will increase water requirements and cause an odor on burnoff, and the latter introduces a flux.

The quality of "stickiness" to metal and refractory surfaces which is important with use of minimum water or bentonite (since higher bentonite content increases the water requirements) is achieved by use of tetrasodium pyrophosphate (TSPP) in contents of 0.2 to 1.5 percent, preferably at about 0.4 percent. The TSPP also aids in preserving the consistency of the material as initially prepared, and functions as a shelf life preservative in these formulations. The amount of 0.2 percent is an amount sufficient to increase storage life. Organic agents such as citric acid and EDTA salts were not found as suitable in this type of formulation because they require additional water for similar consistencies and they tend to degrade causing the appearance of mold and odor. The recommended addition of 1–2 percent aluminum trihydrate is added shelf life insurance, but is not required with the TSPP.

The composition range which essentially comprises this invention (prior to water addition) is as follows:

|  | Suitable (%) | Preferred (%) |
| --- | --- | --- |
| ¼ inch to fines refractory aggregate | 35 – 60 | 40 – 45 |
| −60 mesh tabular or calcined alumina | 15 – 40 | 30 – 35 |
| Bentonite | 4 – 8 | 5 |
| −20 mesh graphite | 10 – 18 | 12 – 16 |
| 75% phosphoric acid | 3 – 10 | 5 – 7 |
| −325 mesh aluminum trihydrate | 0 – 3 | 1 – 2 |
| TSPP | 0.2 – 1.5 | 0.4 |
| −20 mesh silicon metal | 0 – 15 | 5 – 10 |

The blend is tempered by water to the required consistency, suitable, for example, to be scooped out of a container by hand but not so soft as to tend to slump. The water content as determined by a heat lamp dryout can vary from 10–16 percent of the total based on grain sizing and consistency, but is generally 13–15 percent in the preferred embodiment of the formulation.

The following examples illustrate the invention

EXAMPLE I

The following formulation was blended in a Praschak ribbon mixer:

| | |
| --- | --- |
| ¼ inch by fines calcined bauxite | 830 lbs. |
| −325 mesh calcined alumina | 650 |
| Bentonite | 150 |
| −30 mesh Mexican graphite | 275 |
| 75% phosphoric acid | 93 |
| −325 mesh aluminum trihydrate | 25 |
| TSPP | 8 |

41 gallons of water were added to give a moisture level based on an infrared heat lamp dryout of 15 percent. The consistency was determined by use of a special Brookfield Viscosimeter Model HBT, with a five-fold increase in normal stiffness of the torsional element, on the Heliopath stand (which lowers the spindle continuously while measuring). Using the "D" spindle at 5 RPM, readings of a 22–28 range were required for viscosity control.

EXAMPLE II

The following blend was prepared in a Hobart mixer:

| | |
|---|---|
| ⅛ inch by fines calcined So. Amer. bauxite | 8 lb. 5 oz. |
| −325 mesh calcined alumina | 6 lb. 8 oz. |
| Wyoming bentonite | 1 lb. 8 oz. |
| −30 mesh Mexican graphite | 2 lb. 12 oz. |
| 75% phosphoric acid | 1 lb. |
| −325 mesh hydrated alumina | 4 oz. |
| TSPP | 34 grams |
| −20 mesh silicon metal powder | 1 lb. |
| Water | 3 lb. 3 oz. |

This blend has the suitable creamy consistency for hand application with a moisture content of about 14½ percent as measured on an infrared heat lamp dry-out and was thickly applied to a fire brick and open fired at 2750° F, five hours at temperature in an eight hour fire. About 1/16 inch of a sealed oxidized layer essentially protected graphite burnout from the bulk of the sample.

Coarser sizing than given in the examples, up to ¼ inch aggregate, will reduce water requirement and consequent shrinkage but imparts an inferior texture for hand application, where finer grain sizing is usually preferred, therefore requiring a balancing of workability and physical properties.

Carbons, such as pulverized coke fines, can be used in place of graphite but will oxidize more readily in service.

The use of organic agents for improving shelf life, such as citric acid or EDTA salts, has been found to be unsuitable in this type of formulation using graphite because of degradation causing mold development and often an odor on storage of just days or a few weeks.

Tetrasodium pyrophosphate provides a desirable increase in "stickiness" and a shelf life potential of several months of normal ambient storage.

I claim:

1. A plastic refractory composition comprising in percent by weight on the basis of the solids:

| | |
|---|---|
| −¼ inch aggregate of alumina or aluminum silicate | 35–60 |
| −60 mesh tabular or calcined alumina | 20–40 |
| Bentonite | 4–8 |
| −20 mesh carbon particles | 10–18 |
| Phosphate bonding agent | 3–10 |
| −325 mesh aluminum trihydrate | 0–3 |
| −20 mesh tetrasodium pyrophosphate | 0.2–1.5 |
| −20 mesh silicon metal | 0–15 |
| and water to bring to a plastic consistency. | |

2. A composition in accordance with claim 1 wherein the coarse aggregate is selected from the group of refractory materials consisting of tabular alumina, fused alumina, calcined bauxite, calcined clay, kyanite, quartz, crushed fire brick and mixtures thereof, the carbon particles are graphite, the phosphate bonding agent is phosphoric acid, or monoaluminum dihydrogen phosphate having a $P_2O_5$ content equivalent to 75 percent phosphoric acid and the water is present in 10 to 16 percent of the total weight of the composition.

3. A composition in accordance with claim 1 wherein the −¼ inch aggregate is calcined bauxite in 40–45 percent by weight, the −60 mesh material is −325 mesh calcined alumina, the phosphate bonding material is 75 percent phosphoric acid, and the −325 mesh aluminum trihydrate is present in 1–2 percent.

4. A composition in accordance with claim 3 in which silicon metal powder is present in up to 15 percent by weight.

5. In a refractory plastic composition comprising alumina or aluminum silicate, bentonite, carbon, and a phosphate bonding agent, the improvement of having present tetrasodium pyrophosphate in amount effective to increase storage life.

6. The composition of claim 5 in which the alumina or aluminum silicate is calcined, the bentonite is Western bentonite, the carbon is graphite, and the phosphate bonding agent is phosphoric acid.

* * * * *